No. 612,992. Patented Oct. 25, 1898.
A. O. PETERSON.
HARROW TOOTH CLAMP.
(Application filed Feb. 23, 1898.)

(No Model.)

Witnesses
Inventor
A. O. Peterson.

UNITED STATES PATENT OFFICE.

AUGUSTUS O. PETERSON, OF GALESBURG, ILLINOIS, ASSIGNOR OF ONE-HALF TO FRED PETERSON, OF SAME PLACE.

HARROW-TOOTH CLAMP.

SPECIFICATION forming part of Letters Patent No. 612,992, dated October 25, 1898.

Application filed February 23, 1898. Serial No. 671,277. (No model.)

*To all whom it may concern:*

Be it known that I, AUGUSTUS O. PETERSON, a citizen of the United States, residing at Galesburg, in the county of Knox and State of Illinois, have invented certain new and useful Improvements in Harrow-Tooth Clamps; and I do declare the following to be a full, clear, and exact description of the invention, such as will enable others skilled in the art to which it appertains to make and use the same.

My invention has relation to harrow-tooth clamps; and the object is to provide a device of this character by means of which the teeth may be securely clamped to the bar without weakening the bar by forming holes therein and by means of which the teeth may be easily and quickly adjusted vertically as well as horizontally.

With this object in view the invention consists in certain features of construction and combination of parts, which will be hereinafter fully described and claimed.

Figure 1:
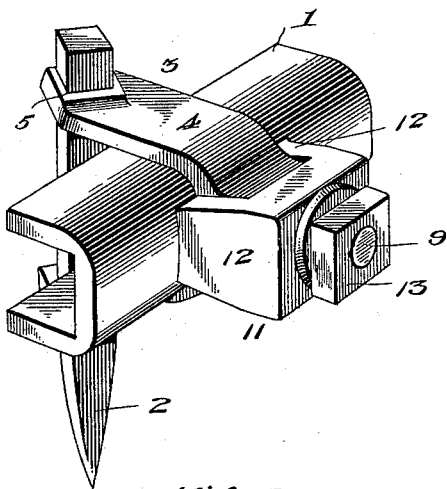
Figure 2:
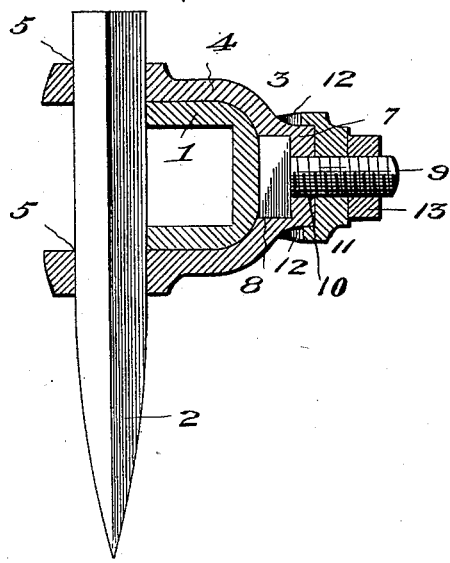

In the accompanying drawings, Figure 1 is a perspective view of a portion of a harrow-tooth bar, showing the harrow-tooth secured thereto by means of my improved clamp; and Fig. 2 is a sectional view taken longitudinally through the clamp.

In said drawings, 1 denotes the harrow-tooth bar, which in the present instance is shown as being made of channel-iron.

2 denotes the tooth, and 3 my improved clamp, by means of which the tooth is clamped to the bar.

The clamp consists of a yoke 4, which embraces the bar and is provided with registering polygonal openings 5, which receive the tooth. The face of the yoke is provided with a square tenon 7, which has on its inner side an angular recess 8, which receives the head of the bolt 9, that projects through a central aperture 10 in the boss.

11 denotes a bridge centrally apertured to receive the free end of the bolt and having its legs 12 embracing the vertical edges of the yoke-boss and engaging the tooth-bar. The inner face of the bridge is provided with an angular recess that receives the boss of the yoke.

13 denotes the clamping-nut.

In operation when it is desired to adjust the tooth either vertically in the apertures of the yoke or adjust the yoke laterally on the tooth-bar the nut is loosened, thus allowing the tenon of the yoke to withdraw from the angular socket of the bridge and permit of the desired adjustment. After the adjustment has been made and it is desired to clamp the parts to hold them as adjusted the nut is screwed home, which draws the boss of the yoke into the recess of the bridge and forces the legs of the bridge against the bar, thus drawing the angular edges of the tooth firmly against the edges of the bar, and thereby securely clamping the parts.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. A harrow-tooth clamp comprising a yoke formed with apertures, a bolt projecting from said yoke, a bridge adapted to embrace the yoke, and provided with an aperture through which the bolt extends, and a nut for engaging the bolt, for the purpose set forth.

2. The combination with a harrow-tooth bar, of a yoke embracing said bar and provided with registering polygonal apertures at the free end of its limbs, and formed with an angular recess and with an angular tenon, a harrow-tooth extending through said apertures, a bolt projecting through an aperture in the tenon and having its head seated in the angular recess, a bridge, the legs of which embrace the vertical edges of the tenon and engage the bar, said bridge being provided with an angular recess and a central aperture, the one to receive the tenon and the other the bolt, a clamping-nut for drawing the tenon of the yoke into the recess of the bridge and thereby clamping the parts in adjustment, substantially as set forth.

In testimony whereof I have hereunto set my hand in presence of two subscribing witnesses.

A. O. PETERSON.

Witnesses:
P. N. GRANVILLE,
O. E. PETERSON.